United States Patent Office 2,983,959
Patented May 16, 1961

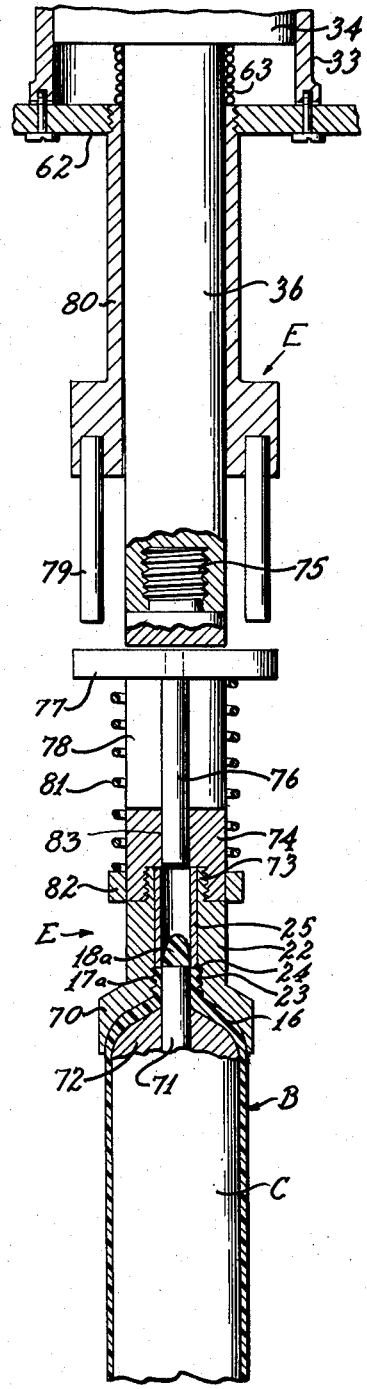

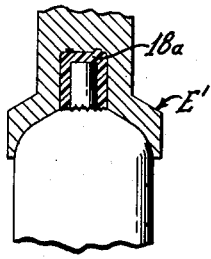
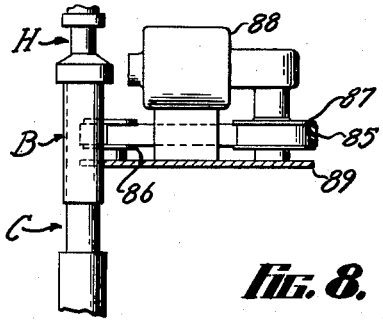
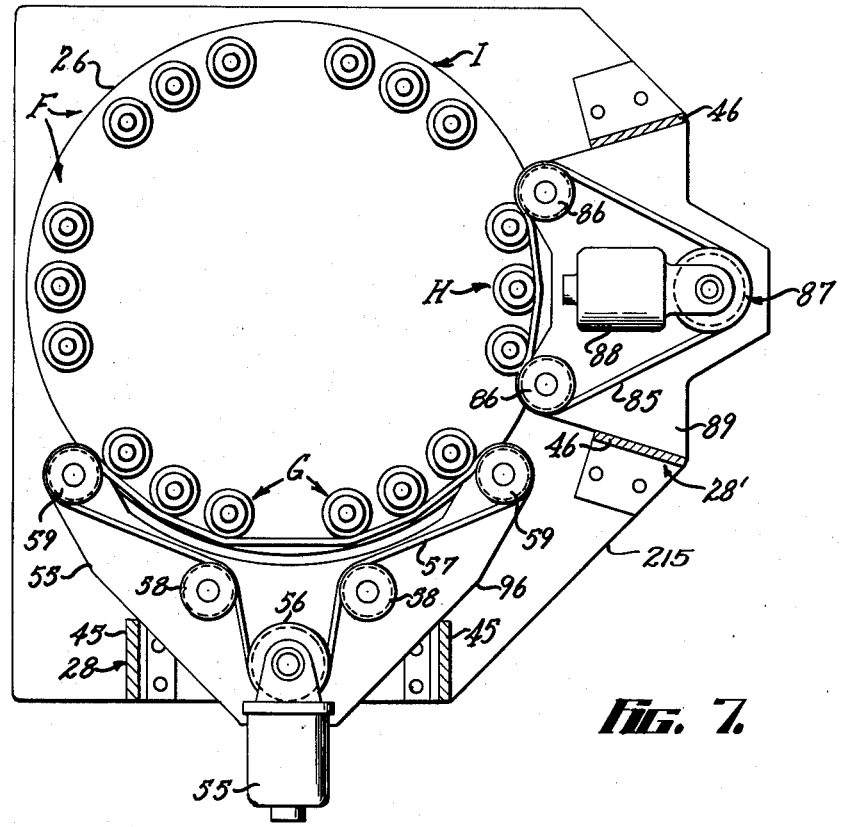

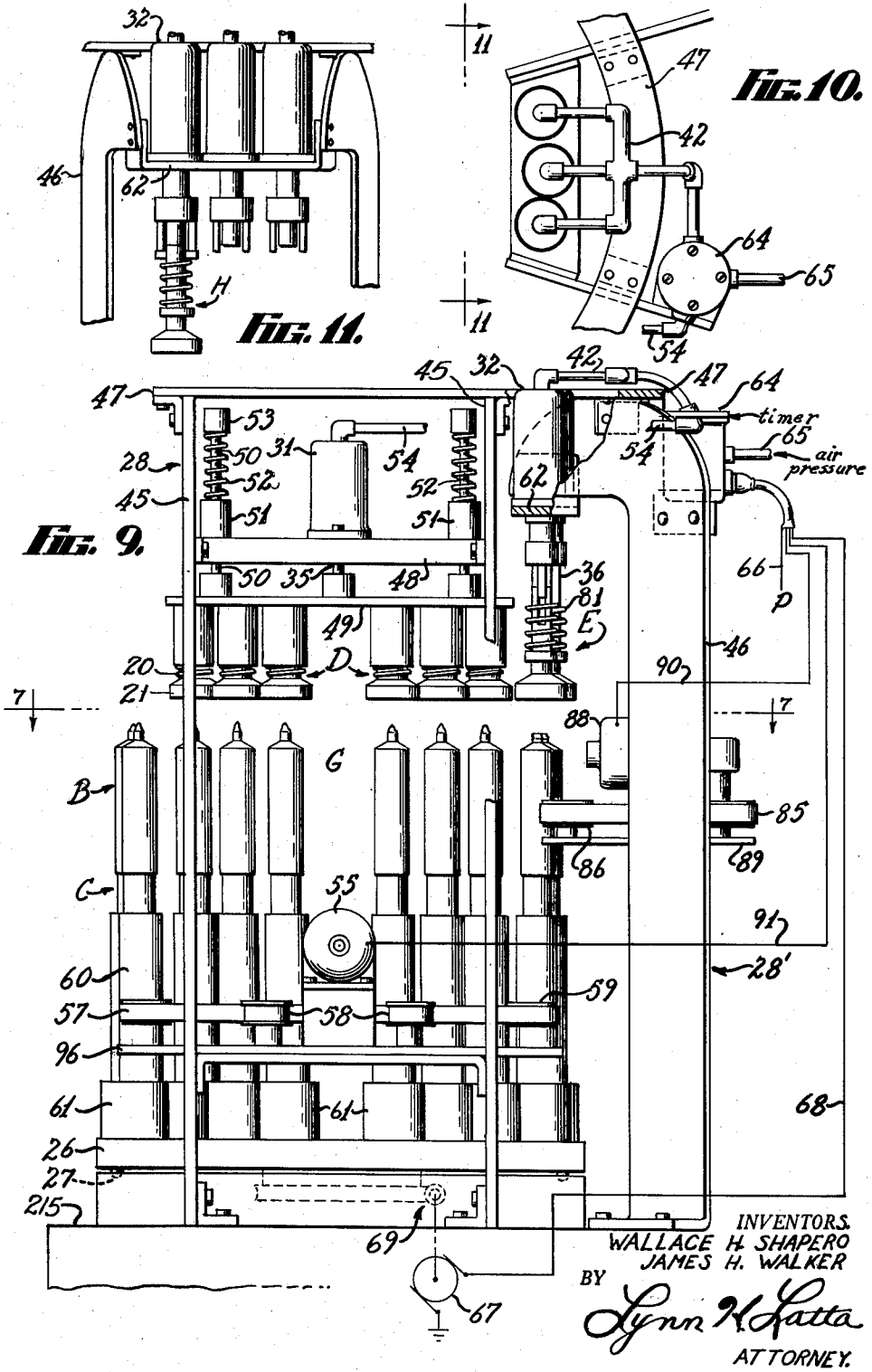

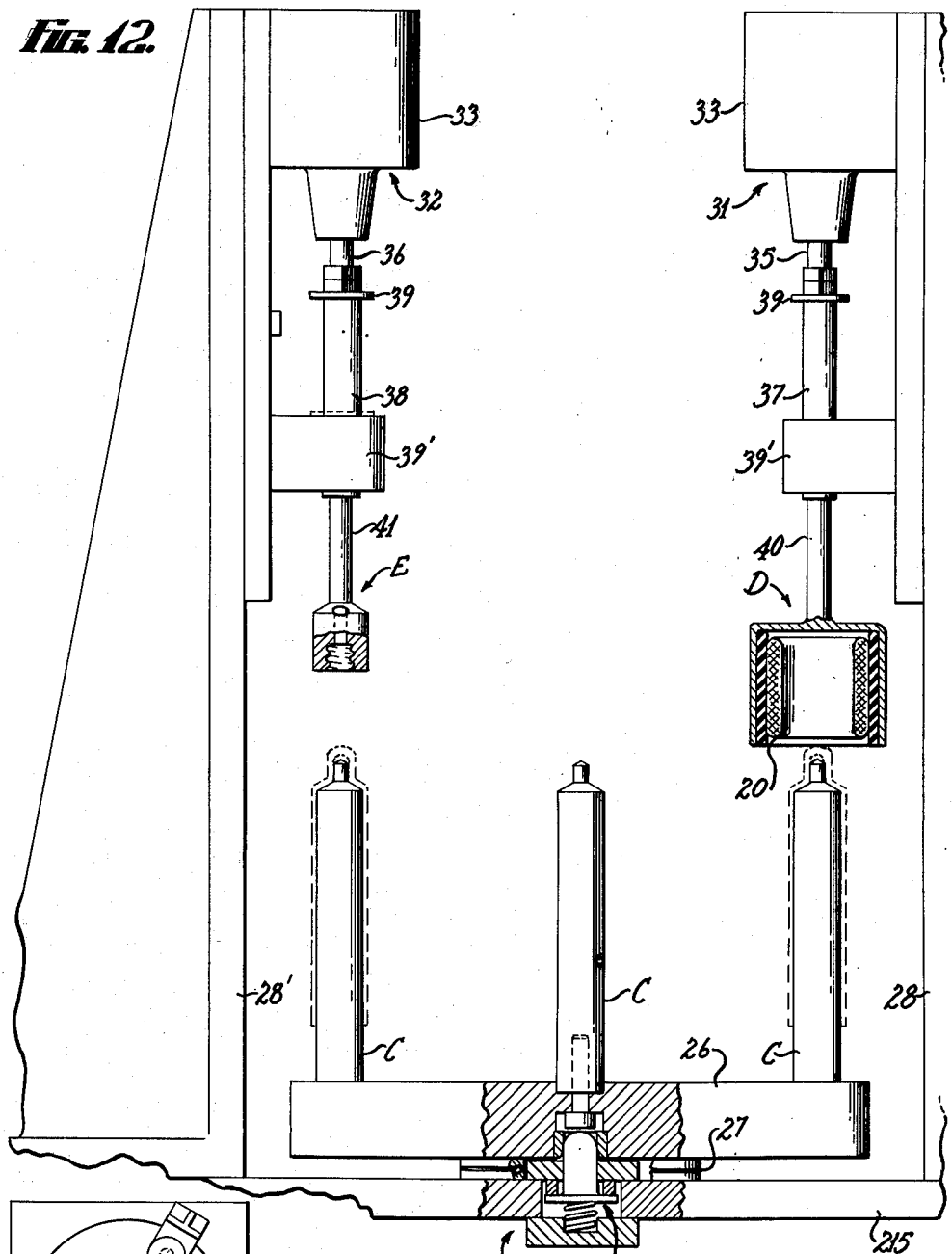

2,983,959
METHOD FOR PROCESSING THE NECK PORTIONS OF THERMOPLASTIC CONTAINERS

Wallace H. Shapero, Santa Ana, and James H. Walker, Los Angeles, Calif., assignors, by mesne assignments, to Continental Can Company, Inc., New York, N.Y., a corporation of New York Filed Aug. 20, 1956, Ser. No. 605,078

10 Claims. (Cl. 18—47.5)

This invention relates to the manufacture of containers of thermoplastic material (e.g. vinyl halide synthetic resin) and has as its general object to provide an improved method of fabricating the neck of such container.

The invention is directed particularly to the manufacture of thermoplastic containers utilizing basically a dip-forming method wherein the entire container body, including mantle and neck, is formed in an inverted position by dipping into a bath comprising liquid thermoplastic material, a heated mandrel having at its lower end the contours of the container and the throat of the neck, whereby to deposit a film of the thermoplastic material on the mandrel in varying thicknesses depending upon the concentration of heat in the mandrel.

One of the problems encountered in such a dip-forming process is the formation of a disfiguring tear on the end of the neck, as the result of the draining of excess liquid to the lower end of the mandrel as it is drawn from the bath. An important object of the invention is to remove such disfigurement in a subsequent processing step.

The invention deals further with the problems of forming an external thread on the container neck and forming a mouth at the end of the neck. Briefly, the invention contemplates an initial step of forming a container having a neck of adequate volume to provide for threading but lacking any threads in the initial stage; and having a closed end; and in later processing steps, softening the neck by reheating and forming an external thread thereon; eliminating the tear; and perforating the end of the neck to provide a mouth therein.

Another object is to provide a novel and improved apparatus for such processing.

The invention is particularly useful in the fabrication of slender, flexible tube containers such as tooth paste tubes, and similar containers for salves, cosmetics, oil colors, food ingredients.

Other objects will become apparent in the ensuing specifications and appended drawing in which:

Fig. 1 is a view illustrating the step of dip-forming the container on a mandrel;

Fig. 2 illustrates the step of reheating the container neck preparatory to forming a thread thereon;

Fig. 3 illustrates the beginning of the thread forming operation;

Fig. 4 illustrates the step of perforating a mouth in the end of the neck;

Fig. 5 shows the separation of the thread-forming die from the container;

Fig. 6 illustrates the re-forming of a sealed neck without forming a mouth therein;

Fig. 7 is a horizontal sectional view of an apparatus for performing the reheating, thread-forming, and perforating steps, taken on the line 7—7 of Fig. 9;

Fig. 8 is a detail sectional view of the unthreading drive;

Fig. 9 is an elevational view of the apparatus;

Fig. 10 is a fragmentary plan view thereof, showing the actuator mechanism of the thread-forming units;

Fig. 11 is an elevational view of the same, taken as indicated by line 11—11 of Fig. 10;

Fig. 12 is a plan view of a modified form of the apparatus; and

Fig. 13 is an elevational view thereof.

*Dip-forming stage*

Referring now to the drawings in detail, and in particular, to Figure 1, the initial stage of fabricating the container involves the dipping of a heated mandrel A, including a tubular lateral wall 10, suspended at its upper end by a tubular stem 11 and having at its lower end a tapering bottom section 12 and a tip 13, into a bath 14 of liquid thermoplastic material from which a film of varying thickness is deposited upon the mandrel A to constitute a container having a flexible tubular lateral wall portion 15, a mantle 16, a tubular neck 17, and a closed end 18 which usually is in the form of a pendant, projecting tear, approximately as shown, as the result of running of excess film material to the lower end of the mandrel.

Prior to the dipping of the mandrel into the bath 14, it is heated so as to cause the liquid thermoplastic material to solidify against its walls to form a film thereon. Any number of stages of alternate preheating and dipping steps may be utilized to attain the required wall thickness in the container body.

Where a flexible tube container is being fabricated, the lateral wall portion 15 thereof may be given a desired thinness by utilizing a mandrel having a tubular lateral wall portion 10 that is relatively thin, and the thicker mantle and neck portions 16 and 17 may be given the desired additional thickness by having a greater thickness in the tapering lower end portion 12 of the mandrel and utilizing a solid tip 13. Thus the portions 12 and 13 will have a higher heat retaining capacity than the thin lateral wall 10 and consequently a greater wall thickness in the deposited film will be built up in the mantle 16 and neck 17 of the container.

After the film is deposited upon the mandrel (either in a single layer or multiple layer form) it is cured (as by oven heating) to harden or set it and thus develop the pre-formed container with unthreaded neck having a closed outer end which is subsequently processed as described hereinafter.

*Re-forming stage*

Fig. 2 schematically illustrates the step of reheating the container neck 17 preparatory to re-forming. Prior to reheating, container B is slipped over a mandrel C which has the internal contours of the container so as to provide full support therefor when the container becomes softened by the reheating operation.

The heat softening of the container neck is effected by lowering over the mandrel supported container a heating device D which preferably includes an annular heating element 20 and a core 21 on which it is mounted. Various types of heating may be utilized (e.g. radiant heating, subjection to a heated atmosphere or high frequency induction heating).

In the heating step, the heating is concentrated as far as possible in the neck of the container, and the neck is reduced to a softened state, subject to reforming, but remaining sufficiently non-fluid to avoid running, i.e. retaining its general shape and wall thickness.

At the completion of the heating step, the container is quickly transferred from the heating unit D to a reforming (e.g. threading) unit E so as to avoid loss of heat and retain the softened state of the container neck, and is subjected to the operation of the reforming die which reshapes the softened neck of the container and then chills it so as to set it in its new form.

Fig. 6 illustrates the reshaping of the bottom 18a of a container having no neck, a reshaping die E' being pressed against the softened bottom 18a to impart to it a flattened, symmetrical end face which may have a symbol or wording impressed therein.

Thread-forming

Figs. 3, 4 and 5 illustrate a re-forming operation wherein the reshaping unit E comprises a threading die including a tubular body 22 having a female thread 23 for shaping a male thread in the softened material of the container neck 17. This is effected by inserting the neck 17 into die E and then exerting pressure axially against the neck 17 so as to cause it to extrude radially into the die thread 23, whereupon the material of neck 17 is chilled by conductive contact with the relatively cool die and the thread thereon is set. As shown in Fig. 3, the inner diameter of die thread 23 is larger than the outer diameter of neck 17 so that the latter can be freely inserted into the die.

The end pressure against neck 17 is applied by an annular shoulder 24 which is preferably the lower end of a hardened tube 25 secured within die body 22 and functioning also as the female die of a piercing die set. The end result is a threaded neck 17a.

Piercing

As the end of the thread-forming step, that portion of closed end 18 of the container neck that remains within the encirclement of piercing die tube 25 is perforated so as to provide an open mouth in the neck.

Fig. 4 illustrates this perforating step, which is preferably executed in the threading die E functioning as a combination threading die and perforating die.

This mouth-forming step is completed while the material of the closed end portion 18 is still sufficiently soft so that the circular edge of separation will heal upon the hardening of the neck, to provide a smooth, top rim at the end of the neck, devoid of any incipient fractures. This is important in order that the neck may be sufficiently tough to withstand the strains imposed upon it by internal pressure and the screwing and unscrewing of the container cap in the use of the container for dispensing its contents.

The apparatus

Referring now to Figs. 7–10, illustrating an apparatus that is used for performing the reheating, threading and perforating steps in rapid succession, such apparatus may comprise a base 215, a turret 26 rotatably mounted thereon through the medium of a bearing 27, a plurality of the mandrels C supported on turret 26; a pair of brackets 28 and 28' secured to and projecting upwardly from base 215; and the reheating and threading units D and E respectively, mounted in the brackets 28, 28' respectively.

The sectional plan view in Fig. 7 illustrates how, by rotating turret 26, the three mandrels C may be successively positioned at the loading station, indicated at F, then at the reheating station G where the heating unit D becomes operative; and then at the threading and perforating station H where the unit E becomes operative; and finally at an unloading station I. At the unloading station I, an operator removes from the mandrels C that have just come from the threading station, the containers that have just had their necks threaded and perforated; and an operator at station F replaces them with partially fabricated containers that are to be threaded. When the latter containers are fitted over the mandrels, the turret 26 is rotated one step (60° in the apparatus shown) bringing the freshly loaded mandrels beneath the heating units D, and bringing a group of freshly heated containers previously at the heating station G, over to the threading station H, and bringing to the unloading station I, the containers just threaded.

At the heating and threading stations, the heating and threading units D and E are moved downwardly from the raised positions shown in Fig. 9 to the operative positions indicated in Figs. 3 and 4. For effecting vertical movement of the units D and E, I provide fluid actuators 31 and 32, each including a cylinder 33 (Fig. 4) a piston 34 and a piston rod, numbered 35 and 36 for the respective actuators.

Before proceeding with a retailed description of specific structural features of the apparatus of Figs. 7–11, attention is directed to Figs. 12 and 13 which disclose a relatively simple manually operable device that can be used for performing the reheating, threading and perforating steps or the heating and threading steps alone, illustrating that the method can be performed by apparatus other than that shown in Figs. 7–11. The apparatus of Figs. 12, 13 embodies all of the parts described above, as indicated by the same reference characters with the exception that no separate unloading station I is utilized, the loading station F functioning also as an unloading station. In this manual apparatus, piston rods 35, 36 are coupled to slide shafts 37, 38 with stop washers 39 interposed, the shafts 37, 38 being slidably mounted in bearings 39', and at their lower ends are provided with threaded sockets to receive the shanks 40, 41 of the heating and threading units D and E.

A suitable manifold 42 is connected to the fluid actuators 31 and 32 as shown in Fig. 10, for simultaneous operation thereof under the control of a timer valve 64.

A manually releasable latch 44 (Fig. 12) may be utilized for retaining the turret 26 successively in each of its three indexing positions. The turret may be indexed manually to its successive positions, and the operator may release the finished container from die E by grasping a mandrel C and a part of die unit E (e.g. a shaft 38) in the two hands and rotating them in opposite directions.

Returning now to the preferred apparatus of Figs. 7–11, the brackets 28, 28' may comprise respective pairs of upright stanchions 45, 46 secured to base 215 as indicated and tied together in any suitable manner, as by an arcuate tie bar 47 at their upper ends. Actuator 31 is mounted by a cross bar 48 of bracket 28. The heating units D are mounted on a cross-head 49 attached to the lower end of piston rod 35 and guided by return rods 50 attached thereto and extending upwardly through bearings 51 mounted on cross bar 48. Return rods 50 extend upwardly through coil springs 52 which are engaged under compression between bearings 51 and heads 53 secured to the upper ends of rods 50. Fluid under pressure injected into actuator 31 through a pressure line 54 is effective to lower the cross-head 49, compressing springs 52. When the fluid pressure is released, springs 52 will return the heating units to the raised, inoperative positions shown in Fig. 9.

At the lower limit of the downward movement of cross head 49, heating units D will be in hooding relation (Fig. 2) to the necks 17 of containers B as carried on mandrels C. Through the operation of a timer hereinafter described, the units D are maintained in these operative positions for a time interval of the correct duration to properly soften the necks 17.

To provide for uniform heating, the mandrels are rotated at the heating station. Apparatus for this purpose comprises an electric motor 55 mounted on a bracket 96 which is supported by bracket 28. Motor 55 drives a pulley 56 (Fig. 7) which drives a belt 57 travelling around pairs of idler pulleys 58 and 59, mounted on bracket 96. A stretch of belt 57 travelling between pulleys 59 engages base portions 60 of mandrels C to transmit rotation to the mandrels.

The mandrels C are arranged in groups of several each (e.g. three or four mandrels per group) and two groups are heated simultaneously at station G by two corresponding groups of heating units D.

The base portions 60 of mandrels C are rotatably mounted in bearings 61 mounted on turret 26.

The threading units E are demountably attached to actuators 32 so as to be replaceable by other reforming units (e.g. threading units of different size or units such as that shown in Fig. 6).

Actuators 32 for the reforming units E, E' have their cylinders 33 mounted on a bracket 62 carried by the upper ends of stanchions 46. Return springs 63 may be engaged between pistons 34 and bracket 62, for raising units E to the inoperative positions shown in Fig. 9. A manifold 42 conveys pressure fluid simultaneously to actuators 32 from a timer 64, which is a conventional device of a known type embodying a valve for intermittently transmitting pressure fluid from a pressure line 65 to an outlet connected to manifold 42, under the control of a time-regulated actuator (e.g. electric motor) connected to a suitable source of power P by a conductor 66. The timer also includes an electric controller for intermittently directing current to a turret driving motor 67 through actuation of units D and H. Motor 67 drives turret 26 through suitable reduction gearing, indicated schematically at 69.

The pressure fluid supply tube 54 of actuator 31 is connected to timer 64 so that actuator 31 is energized in unison with actuators 32.

A threading unit E (Figs. 3–5) comprises the tubular die 22 having the former-thread 23 and a head 70 which has a die recess of the correct shape to finish the contour of mantle 16 of container B accurately to a prescribed contour of high uniformity in succeeding containers. Tube 25 is press-fitted into die 22 and its lower end provides the shoulder 24 which defines the upper extremity of the thread-former cavity, and squares off the upper end of the threaded neck 17a which is formed in the cavity.

Tube 25 is of hardened steel or equivalent, and constitutes the female portion of the perforating die set, its lower end being sharpened to provide a shearing edge on shoulder 24. A rod 71 is mounted in the body 72 of mandrel C and projects from the upper end thereof to constitute a stem which supports neck 17 internally while pressure is being applied thereto by shoulder 24 to expand the neck into the die cavity. Stem 71 also functions as a punch, entering the lower end of tube 25 at the end of the forming stroke and punching the end 18 out of the neck to form a mouth therein. A slug 18a is left in tube 25.

Die 22 has a reduced threaded end 73 which is demountably coupled in a threaded socket in the lower end of a shank 74. Shank 74 in turn has a reduced threaded end 75 which is coupled into a threaded socket in the lower end of piston rod 36.

For removing slug 18a, the invention provides an ejector pin 76 having a T-head 77 secured to its upper end. Head 77 slides vertically in a slot 78 extending diametrically through shank 74 and its ends project for engagement with stop pins 79 anchored in the headed lower end of a sleeve 80. Sleeve 80 is mounted in bracket 62 and provides a bearing bushing for rod 36. A coil spring 81 is engaged under compression between T-head 77 and a collar 82 on the lower end of shank 74. The lower portion of the ejector pin 76 is slidable in a bore 83 in the unslotted lower end portion of shank 74, registering with tube 25.

Upward return movement of thread-former unit E brings the projecting ends of T-head 77 into engagement with stop pins 79, arresting the movement of ejector pin 76 while shank 74 and die 22 continue to rise, compressing spring 81. Thus the ejector pin 76 is extended through tube 25, engaging slug 18a and ejecting it. When thread-former unit E is again lowered, ejector pin 76 is retracted by spring 81 until arrested by engagement of head 77 with the upper end of slot 78.

Referring now to Figs. 7 and 8, the separation of threaded necks 17a from dies 22 is effected by rotation of the containers simultaneously with release of fluid pressure in actuators 32 so as to provide for upward movements of the threading dies in response to the unthreading movement resulting from such rotation. For thus rotating the containers, there is provided a belt 85 travelling around a pair of idler pulleys 86 and a drive pulley 87. The latter is driven by a motor 88 which, with pulleys 86, is mounted on a bracket 89 mounted between stanchions 46 of bracket 28'.

Motor 88 is controlled by timer 64 (e.g. as by a conductor connection 90 to a switch portion of the timer) which is actuated to close the circuit to motor 88 when fluid pressure in actuators 31, 32 is released.

Motor 55 is also controlled by timer 64, but is energized at an earlier point in the cycle of operation, so that containers B will be rotated continuously during the interval when heat units D are in proximity to the container necks (which interval may constitute substantially the full interval between indexing movements of turret 26). A conductor connection 91 to a switch part of the timer may be utilized to effect this control.

It will be understood that the several circuits 68, 90 and 91 may be provided with separate controller switches or contacts in timer 64 so that the correct sequence of energizing the several motors 67, 88 and 55 may be attained. However, since such timer arrangements are within the knowledge and skill of those in the art who deal with sequential controls, the detailed construction of the timer has not been shown, and the electrical circuits are indicated schematically in skeletonized style.

We claim:

1. A method of fabricating a flexible tube container of thermoplastic resin, comprising the following steps: forming a container having a body and an unthreaded neck of reduced diameter substantially the same as the final neck diameter including a tubular portion and a solid closed end portion; placing the container on a mandrel; subsequently heat-softening the neck; immediately positioning the mandrel having a stem entering said neck to support the same internally in axial alignment with a threading die with the softened neck in opposed relation to the die; then immediately bringing the die and mandrel together along their common axis and thereby extruding said softened neck into the die to form a thread on the softened neck; and simultaneously utilizing said stem and die cooperatively to punch out said closed end portion to form a mouth in the neck while said neck remains in a softened state such that the edge of separation in the neck will heal to provide a smooth end rim in the finished container.

2. A method of fabricating a threaded-neck flexible tube container of thermoplastic resin, comprising the following steps: pre-forming a container having a tubular body and an unthreaded neck of reduced diameter substantially the same as the final neck diameter including a tubular portion and an integral solid end portion closing the outer end thereof; subsequently placing the container over a mandrel fitting its internal wall, for support; moving the mandrel to a heating station, stopping it there and applying heat to said neck to soften it; then immediately moving the mandrel to a threading station, stopping it there, with the softened neck in axial alignment with and opposed to a threading die; then immediately bringing the die and neck together and thereby extruding said softened neck into the die, whereby to form a thread on the neck and simultaneously punching out said integral end portion to provide a mouth in the neck while said neck remains in a softened state such that the edge of separation in the neck will heal to provide a smooth end rim in the finished container.

3. A method of forming a threaded-neck flexible tube container of thermoplastic resin, comprising the following steps: dipping a heated mandrel into an unheated solution of the resin so as to deposit on the mandrel a film in the form of a container including a relatively thin tubular body and an unthreaded neck of reduced diameter substantially the same as the final neck diameter including a relatively thick tubular wall portion and an integral solid end portion closing the outer end thereof; curing said film to develop the container; then placing the container over a mandrel fitting its internal wall, for support; utilizing the mandrel to transport the container first to a heating station and then to a threading station; heat-softening said neck by a reheating operation at said heating station; aligning said neck in opposed, coaxial relation to a threading die at said threading station and bringing the die and said neck together along an axial path so as to extrude the neck into said die, whereby to form a thread on said neck and simultaneously punching out said integral end portion to form a mouth in said neck while said neck remains in a softened state such that the edge of separation in the neck will heal to provide a smooth end rim in the finished container; and subsequently effecting relative rotation between said mandrel and die in an unthreading direction so as to unscrew the neck from the die.

4. A method of fabricating a flexible tube container of thermoplastic resin, comprising the following steps: preforming a container having a body and an unthreaded neck of reduced diameter substantially the same as the final neck diameter including a tubular portion and a solid closed end portion; placing the container on a mandrel; heat-softening the neck; then positioning the mandrel in axial alignment with a reforming die while maintaining the softened state of the neck and with the neck in opposed relation to the die; bringing the die and mandrel together along their common axis so as to extrude the softened neck into the die, whereby to reshape the neck and said closed end portion into symmetrical form and simultaneously punching out said closed end portion to provide a mouth in the neck while said neck remains in a softened state such that the edge of separation in the neck will heal to provide a smooth end rim in the finished container; and cooling the neck by contact with the die so as to set the neck in its reformed shape.

5. The method defined in claim 4, wherein said reforming step is utilized to imprint a design in said closed end portion.

6. A method of fabricating a flexible tube container of thermoplastic resin, comprising the following steps: dipping a heated mandrel in an inverted position into a solution of the resin so as to deposit on the mandrel a film in the form of a container including a relatively thin-walled tubular body, an unthreaded neck of reduced diameter substantially the same as the final neck diameter including a tubular portion and a solid closed end portion including a tear projection resulting from collection of excess material flowing downwardly from the remainder of the container; developing the unthreaded container from said film resoftening the neck by the application of heat in a subsequent processing step; completely supporting the neck internally and extruding it into a threading die by relative movement between the neck and die along the axis of the neck; to mold an external thread thereon and simultaneously punching out said closed end to eliminate said tear projection while said neck remains in a softened state such that the edge of separation in the neck will heal to provide a smooth end rim in the finished container; then conducting heat away from said neck into said die to cool said neck so as to set said thread; and subsequently unthreading said neck from said die.

7. A method of fabricating a flexible tube container of thermoplastic resin, comprising the following steps: dipping a heated mandrel in an inverted position into a solution of the resin so as to deposit on the mandrel a film in a form of a container including a relatively thin-walled tubular body, an unthreaded thicker-walled neck of reduced diameter substantially the same as the final neck diameter, including a tubular portion and a solid closed end portion including a tear projection resulting from collection of excess material flowing downwardly from the remainder of the container; subsequently softening the neck by the application of heat in a reheating operation; supporting the neck internally and impressing it into a die by relative axial movement between the neck and die to reshape it to a required uniform external contour; and simultaneously punching out said closed end portion to eliminate said tear projection and provide a mouth in the neck while said neck remains in softened state such that the edge of separtion in the neck will heal to provide a smooth end rim in the finished container.

8. A method of fabricating a flexible tube container of thermoplastic resin, comprising the following steps: forming a container having a relatively thin-walled body and an unthreaded neck of reduced diameter substantially the same as the final neck diameter, including a relatively thick tubular portion and an integral end portion closing the outer end thereof; subsequently placing the container over a mandrel having a free upper end provided with a stem entering said neck to provide internal support therefor; applying heat to said neck to soften it; then positioning the mandrel to bring said neck into opposed coaxial relation to an internally threaded reforming die while maintaining the softened state of the neck; bringing the die and mandrel together along their common axis so as to extrude the softened neck into the die while supporting the neck around said stem, whereby to reshape the neck with an external thread thereon, and simultaneously utilizing said stem and die cooperatively to punch out said end portion of the neck to provide a mouth in the neck while said neck remains in a softened state such that the edge of separation in the neck will heal to provide a smooth end rim around said mouth in the finished container; cooling the neck by contact with the die so as to set said external thread; and subsequently effecting relative rotation between said mandrel and die in an unthreading direction so as to unscrew the neck from the die.

9. A method of fabricating a flexible tube container of thermoplastic resin, comprising the following steps: forming a container having a relatively thin-walled body and an unthreaded neck of reduced diameter substantially the same as the final neck diameter, including a relatively thick-walled tubular portion and a solid end portion closing the outer end thereof; subsequently placing the container over a mandrel projecting upwardly from a support and having at its upper end a stem entering the neck for internally supporting the same; moving the mandrel to a heating station and stopping it there; lowering over the upper end of the mandrel-supported container an annular radiant heating device to a position encircling said neck portion of the container while leaving said thin-walled body portion of the container exposed externally of said heating device so as to remain relatively unaffected thereby; radiating heat from said device radially into said neck to heat-soften the same while leaving the said thin-walled tubular body portion exposed to atmosphere so as to remain substantially unheated; then immediately raising the heating device to clear the mandrel necks and then moving the mandrel to a threading station and stopping it there with the softened neck in axial alignment with and opposed to a threading die; then bringing the die and neck together while the neck remains in the heat-softened state and thereby extruding said softened neck into the die while supported internally by said stem to form an external thread on the neck; utilizing said stem and die cooperatively to punch out said solid end portion of the neck to provide a mouth therein while the mandrel and container remain at said threading station; leaving the neck in contact with the die to cool and set the thread on said neck; and subsequently effecting relative rotation between said mandrel and die in an unthreading direction so as to unscrew the neck from the die and thereby separate the container therefrom.

10. A method of fabricating a flexible tube container of thermoplastic resin, comprising the following steps: forming a container having a relatively thin-walled body and an unthreaded neck of reduced diameter substantially the same as the final neck diameter, including a relatively thick-walled tubular portion and a solid end portion closing the outer end thereof; subsequently placing the container over a mandrel projecting upwardly from a support and having at its upper end a stem entering the neck for internally supporting the same; moving the mandrel to a heating station and stopping it there; lowering over the upper end of the mandrel-supported container an annular radiant heating device to a position encircling said neck portion of the container while leaving said thin-walled body portion of the container exposed externally of said heating device so as to remain relatively unaffected thereby; radiating heat from said device radially into said neck to heat-soften the same while leaving the said thin-walled tubular body portion exposed to atmosphere so as to remain substantially unheated; then immediately moving the mandrel to a reforming station and positioning it in axial alignment with a reforming die above and opposed to said neck; bringing the die and mandrel together along their common axis while maintaining the softened state of the neck, whereby to extrude the softened neck into the die while supported internally by said stem so as to reshape the neck and said integral end portion into symmetrical form; utilizing said mandrel stem and die cooperatively to punch out said solid end portion of the neck to provide a mouth in the neck while the mandrel and container remain at said reforming station; cooling the neck by contact with the die so as to set the neck in its reformed shape; and subsequently withdrawing the neck from the die and removing the container from the mandrel.

References Cited in the file of this patent

UNITED STATES PATENTS

| | | |
|---|---|---|
| 1,717,248 | Pestalozza | June 11, 1929 |
| 2,257,068 | Parsons | Sept. 23, 1941 |
| 2,306,163 | Greifendorf | Dec. 22, 1942 |
| 2,307,114 | Dichter | Jan. 5, 1943 |
| 2,588,571 | Porter | Mar. 11, 1952 |
| 2,636,215 | Smith | Apr. 28, 1953 |
| 2,695,423 | Pardee et al. | Nov. 30, 1954 |
| 2,697,250 | Heinzelman | Dec. 21, 1954 |
| 2,786,238 | Shapero | Mar. 26, 1957 |
| 2,792,593 | Hardgrove | May 21, 1957 |

FOREIGN PATENTS

| | | |
|---|---|---|
| 160,858 | Australia | Feb. 1, 1955 |
| 1,114,708 | France | Dec. 19, 1955 |